United States Patent
Chen et al.

(10) Patent No.: US 11,146,509 B2
(45) Date of Patent: Oct. 12, 2021

(54) SYSTEMS AND METHODS OF INSTANT-MESSAGING BOT SUPPORTING HUMAN-MACHINE SYMBIOSIS

(71) Applicant: D8AI Inc., Taipei (TW)

(72) Inventors: Chung-Lin Chen, Taipei (TW); Hsi-Shu Mao, Taipei (TW); Lien-Chin Chen, Taipei (TW); Richard Li-Cheng Sheng, Davis, CA (US); Hui Hsiung, Pasadena, CA (US)

(73) Assignee: D8AI Inc., Taipei (TW)

( * ) Notice: Subject to any disclaimer, the term of this patent is extended or adjusted under 35 U.S.C. 154(b) by 194 days.

(21) Appl. No.: 16/677,645

(22) Filed: Nov. 7, 2019

(65) Prior Publication Data
US 2021/0144106 A1 May 13, 2021

(51) Int. Cl.
*H04L 12/58* (2006.01)
*G06F 40/56* (2020.01)
*G06Q 30/02* (2012.01)

(52) U.S. Cl.
CPC ............ *H04L 51/02* (2013.01); *G06F 40/56* (2020.01); *H04L 51/046* (2013.01); *G06Q 30/0281* (2013.01)

(58) Field of Classification Search
None
See application file for complete search history.

(56) References Cited

U.S. PATENT DOCUMENTS

| | | | |
|---|---|---|---|
| 2003/0182391 A1* | 9/2003 | Leber | G06F 16/951 709/217 |
| 2017/0250930 A1* | 8/2017 | Ben-Itzhak | G06F 3/011 |
| 2019/0243899 A1* | 8/2019 | Yi | H04M 3/527 |
| 2021/0029246 A1* | 1/2021 | Erhart | H04L 51/02 |

* cited by examiner

*Primary Examiner* — Quynh H Nguyen
(74) *Attorney, Agent, or Firm* — Winston Hsu

(57) ABSTRACT

A system and method of instant-messaging bot that provide a chatbot and human agents working in accord in communicating with users over a public instant-messaging (IM) platform includes a chatbot application and an IM platform, both built for an enterprise. The enterprise IM platform is connected to the chatbot application and separately connected to one or more public IM platforms via the Internet. The chatbot application contains software for receiving, processing, analyzing and responding to human-generated messages in a human-like manner. The enterprise IM platform contains software for managing traffic of IM messages exchanged among the chatbot, one or more human agents connected to the enterprise IM platform, and any user connected to one of the public IM platforms.

4 Claims, 5 Drawing Sheets

SYSTEMS AND METHODS OF INSTANT-MESSAGING BOT SUPPORTING HUMAN-MACHINE SYMBIOSIS

BACKGROUND OF THE INVENTION

1. Field of the Invention

The subject matter disclosed herein relates generally to chatbots, natural language processing, instant messaging (messaging apps), human-chatbot communication, and Internet communication. In particular, the present disclosure describes systems and methods for human-chatbot communication implemented via instant messaging and enhanced with human-chatbot symbiosis.

2. Description of the Prior Art

A chatbot is a computer program employing artificial intelligence that simulates interactive human conversation with human users. With the advancements of artificial intelligence technology, in particular natural language processing, chatbots have seen widespread uses in areas such as information inquiry, customer-facing activities, and virtual assistants. Enterprises or organizations are using tailor-made chatbots to communicate with their customers, and some are using enterprise-grade virtual assistants to aid their employees carrying out workflows.

With the omnipresent Internet and proliferating smartphones, mobile instant messaging (messaging apps) has become a dominant form of human communication. Globally, billions of people use mobile instant messaging on daily basis. There are some twenty instant-messaging (IM) platforms having at least ten million active users, and among the most popular ones are WhatsApp, Facebook Messenger and WeChat, with each supporting over a billion active users. It is of no coincidence that a few popular IM platforms have become channels for thousands of chatbots (known as IM bots)—some provided by third-party software developers as tools used by IM users directly, and others deployed by enterprises for the purpose of accessing and serving IM users as their target customers.

FIG. 1 depicts an enterprise chatbot connected via the Internet cloud to a public IM platform. Normally, traffic of messages (depicted with solid arrows) between the public IM platform and the chatbot application is handled by an event-driven method known as "webhook", with either end (chatbot or IM platform) addressable by a Uniform Resource Locator (URL). Ideally, a chatbot alone may act as a virtual agent for the enterprise, using instant messaging to "chat" with an external user (customer) over the public IM platform. However, since we are still in a "weak artificial intelligence" era, a chatbot in practice could normally only handle relatively simple or routine business conversations. A human agent is often needed to step in for a chatbot whenever an IM conversation with a customer is beyond the capacity of that chatbot. In the prior art, a human agent for the enterprise could only use the same public IM platform to communicate with the external user (depicted with dotted arrows in FIG. 1), providing that the agent's name is already listed on the user's approved contact list (known as "friend list")—which is usually not the case.

In summary, instant-messaging bots in the prior art do not support an effective human-chatbot symbiosis necessary for dealing with frictions and frustrations often encountered by users of IM bots. A solution to this common pain point is in need.

SUMMARY OF THE INVENTION

The present disclosure describes systems and methods of instant-messaging bot that provide a scheme for a chatbot and human agents working in accord in communicating with users over a public instant-messaging (IM) platform. Such a system includes a chatbot application and an IM platform built for an enterprise (or organization) and connected with each other. The enterprise IM platform is further connected to one or more public IM platforms over the Internet.

The system allows any user connected to any one of the public IM platforms, and the chatbot and human agents connected to the enterprise IM platform, to use instant messaging to communicate with one another either one-to-one or as a group (known as "group chat"). On a connected public IM platform, although a user may only allow a single contact channel on his/her contact list for the enterprise, a method is provided here such that the user can communicate with the chatbot (virtual agent) and the human agents either individually or together using the single messaging channel. Furthermore, each enterprise agent, virtual or live, is individually identifiable during such messaging conversation. Messages of the same conversation are also shown in real time on the enterprise IM platform for the participating human agents to interact with the shown messages.

The present disclosure further provides an escalation mechanism for a user-chatbot conversation automatically escalated to one that includes a live agent whenever a preset condition for escalation is met.

These and other objectives of the present invention will no doubt become obvious to those of ordinary skill in the art after reading the following detailed description of the preferred embodiment that is illustrated in the various figures and drawings.

DETAILED DESCRIPTION

The scope of the present invention is defined by the claims appended to the following detailed description, while the embodiments described herein serve as illustrations, not limitations, of the claims.

Figure 2:
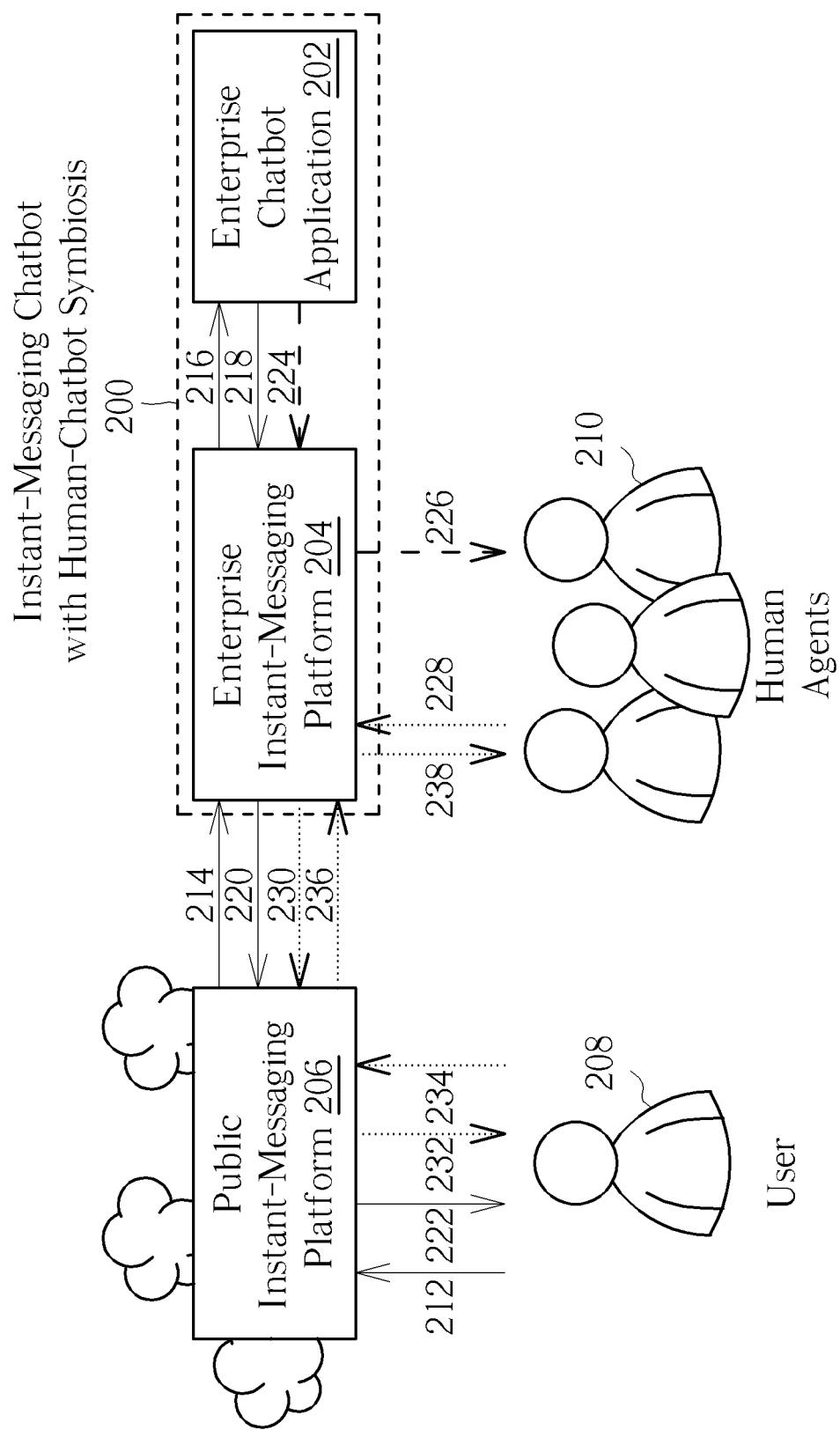
FIG. 2 is a block diagram illustrating an instant-messaging bot supporting human-chatbot symbiosis consistent with some embodiments of the present invention.

FIG. 2 illustrates an instant-messaging bot supporting human-chatbot symbiosis 200. The system includes a chatbot application 202 and an IM platform 204 built for an enterprise (or organization) and connected with each other. The enterprise IM platform 204 is further connected to a public IM platform 206 over the Internet. The system allows any user 208 connected to the public IM platform 206, and the chatbot 202 and human agents 210 connected to the enterprise IM platform 204, to use instant messaging to communicate with one another either one-to-one or as a group.

Figure 3:
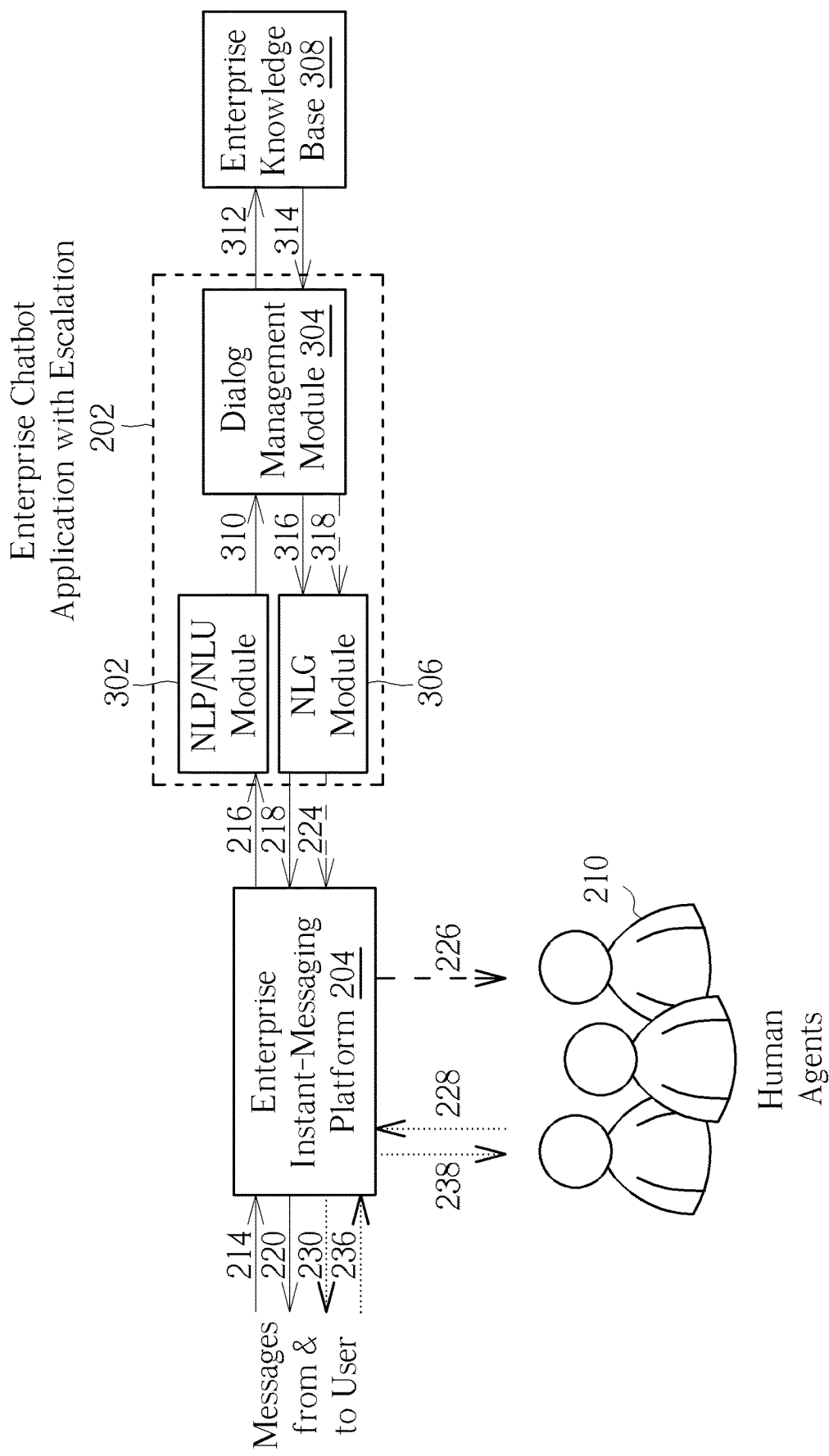
FIG. 3 is a block diagram illustrating an instant-messaging bot providing an escalation mechanism for human-chatbot symbiosis consistent with some embodiments of the present invention.

The enterprise IM platform 204 includes software for managing traffic of IM messages exchanged among the external user 208, the human agents 210 and the chatbot 202 of the enterprise. In FIG. 2 and FIG. 3, traffic of the message exchange between the user 208 and the chatbot 202 is indicated with solid arrows, and that between the user 208 and the human agents 210 is indicated with dotted arrows. The dashed arrows depict the path of an escalation message originated from the chatbot 202 and delivered to one or more human agents 210 (see below).

Figure 1:
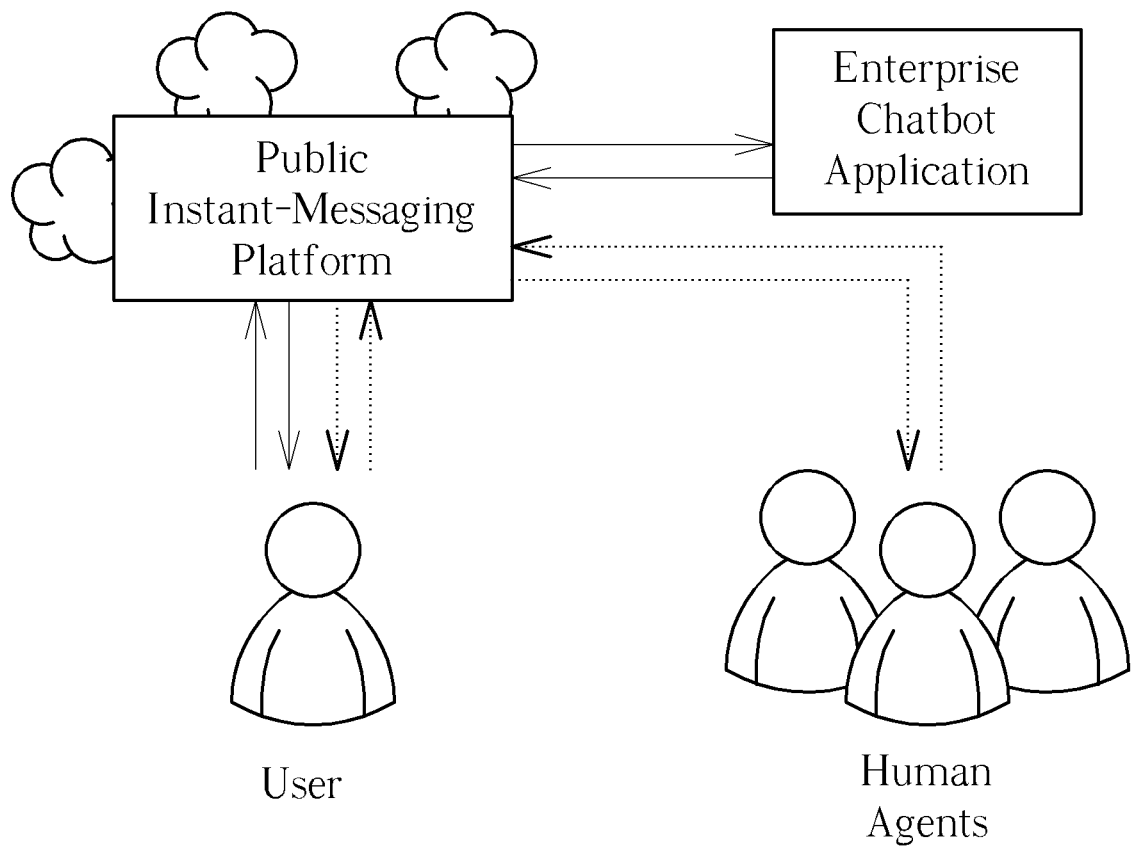
FIG. 1 is a block diagram illustrating an instant-messaging bot in the prior art.

Unlike the prior art of FIG. 1, the addition of the enterprise IM platform 204 for the present invention allows the human agents 210 to participate in an ongoing IM conversation between the user 208 and the chatbot 202, and hence any friction or frustration likely encountered by the user during the user-chatbot conversation may be remedied on the occasion, resulting in a better user experience for the enterprise. Furthermore, the enterprise IM platform 204 supports that while a human agent 210 is communicating with the external user 208, the agent may conduct a parallel, one-to-one private IM communication with the chatbot 202 (e.g., to request for user information) or with another human agent 210 (e.g., to seek consultation).

A preferred embodiment for the Internet connection between the enterprise IM platform 204 and the public IM platform 206 is to use the so-called "webhook" method, with either IM platform addressable by a Uniform Resource Locator (URL).

The chatbot application 202 includes software for receiving, processing, analyzing and responding to human-generated messages in a human-like manner. As shown in FIG. 3, the chatbot software consists of three major parts: (1) a natural language processing and understanding (NLP/NLU) module 302 for analyzing intent of an incoming message either from the user 208 or from a human agent 210, (2) a dialog management (DM) module 304 for interpreting the output (intent) from the NLP/NLU module 302, analyzing context of the ongoing human-chatbot communication, including preceding messages or other information related to the communication, and providing a responding instruction as output, and (3) a natural language generating (NLG) module 306 for receiving the responding instruction from the DM module 304 and generating a reply message either to the user 208 or to the human agent 210. In some cases, the DM module 304 is linked to a knowledge base 308 of the enterprise to access additional information (e.g., user's profile or past dialog) related to an ongoing IM conversation. Referring to FIG. 2 and FIG. 3, the information flow for a complete cycle of "user says and chatbot replies" is depicted with solid arrows in the following sequence: 212, 214, 216, 310, 312, 314, 316, 218, 220, and 222.

It is not uncommon for an enterprise-grade chatbot to provide an incorrect answer, or no answer at all, to a user's inquiry, either due to the chatbot's inability to understand the nuances of human language or simply due to its lack of sufficient information. This could be taken as a poor user experience and detrimental for the enterprise. When this happens, a prompt intervention by a live agent representing the enterprise offers a good remedy, and the present invention provides such a solution. Referring to FIG. 3, the dialog management module 304 is able to analyze context and sentiment of the user-chatbot conversation. Whenever a preset condition for escalation is met (for example, the user repeats the same question or his/her messages show signs of impatience), an escalation mechanism is activated by the DM module 304. Instead of sending a reply message to the user 208, the chatbot 202 sends an escalation message to one or more pre-arranged human agents 210, prompting the agent(s) to engage in the subsequent IM conversation by sending a greeting message to the user. Referring to FIG. 2 and FIG. 3, the escalation information flow is depicted with dashed arrows in the following sequence: 318, 224, and 226. A subsequent agent-user conversation cycle is depicted with dotted arrows in the following sequence: 228, 230, 232, 234, 236, and 238.

Figure 4:
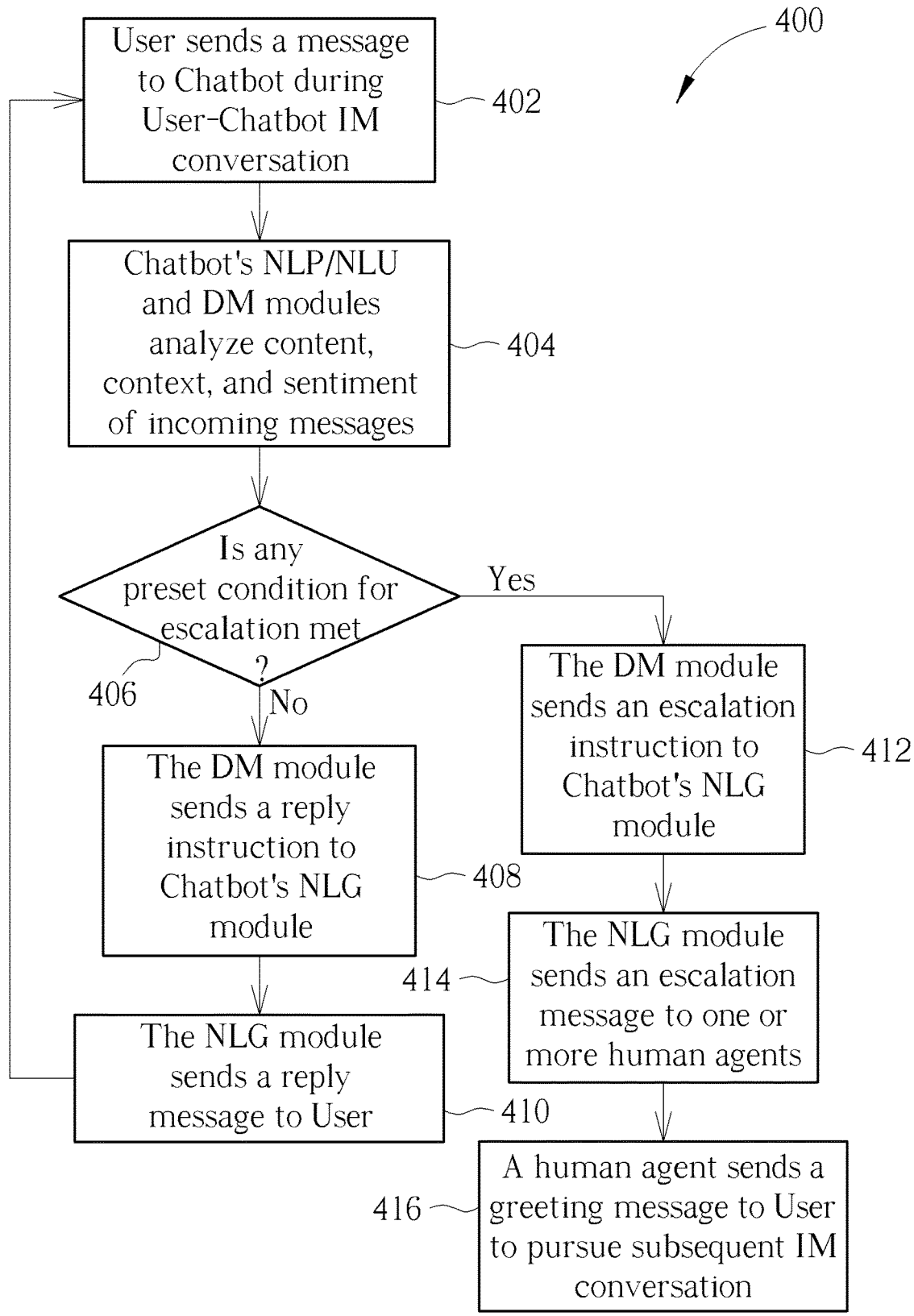
FIG. 4 is a flowchart of a method for automatically escalating a user-chatbot IM conversation to one that includes a human agent consistent with some embodiments of the present invention.

FIG. 4 is a flowchart of a method for automatically escalating a user-chatbot conversation to one that includes one or more human agent whenever a preset condition for escalation is met. Flowchart 400 comprises the following sequence of operations:

operation 402, wherein the user 208 sends a message to the chatbot 202 during an IM conversation between the user and the chatbot;

operation 404, wherein the NLP/NLU module 302 and the DM module 304 analyze content and context, as well as sentiment, of the incoming message and one or more preceding messages;

operation 406, based on the analysis in operation 404, the DM module 304 determines whether any preset condition for escalation is met; if not, the process flow moves on to operation 408;

otherwise, the process flow is diverted to operation 412;

operation 408, wherein the DM module 304 sends a reply instruction to the NLG module 306; operation 410, wherein the NLG module 306 generates a reply message to the user 208, and the process flow returns to operation 402;

operation 412, wherein the DM module 304 sends an escalation instruction to the NLG module 306 if a condition for escalation is met;

operation 414, wherein the NLG module 306 generates an escalation message and directs it to one or more pre-arranged human agents 210; and operation 416, wherein one of the human agents 210 sends a greeting message to the user 208 to pursue subsequent IM conversation with the user.

Over the public IM platform 206, the user 208 sees only a single messaging channel for communicating with the enterprise that deploys the chatbot 202, providing that the enterprise is already listed on the user's contact list. In the prior art of FIG. 1, this messaging channel is dedicated to the enterprise chatbot. The present invention provides a method for sharing the single messaging channel among the chatbot 202 and human agents 210 of the enterprise. The channel-sharing method is included in software of the enterprise IM platform 204 and contains the following functions:

1. The IM platform 204 automatically attaches visible identification (ID) labels to messages passing through it to identify the receiver and the sender of every message whenever necessary to avoid ambiguity. This allows the chatbot 202 and human agents 210 to share a single messaging channel over the public IM platform 206 while communicating with the user 208;

2. The IM platform 204 receives any incoming message from the user without a receiver ID and directs it to an enterprise receiver according to the following rule: (1) sending the message to the chatbot 202 or one of the human agents 210 who is the current participant of ongoing IM communication with the user 208; (2) sending the message to the chatbot 202 or one of the human agents 210 who is designated as the default receiver if the user's message is to initiate a new IM communication; and 3. The IM platform 204 supports multi-channel messaging for any human agent 210 to engage in an IM communication with either the chatbot 202 or another human agent 210 in parallel with his/her ongoing IM communication with the user 208.

Figure 5:
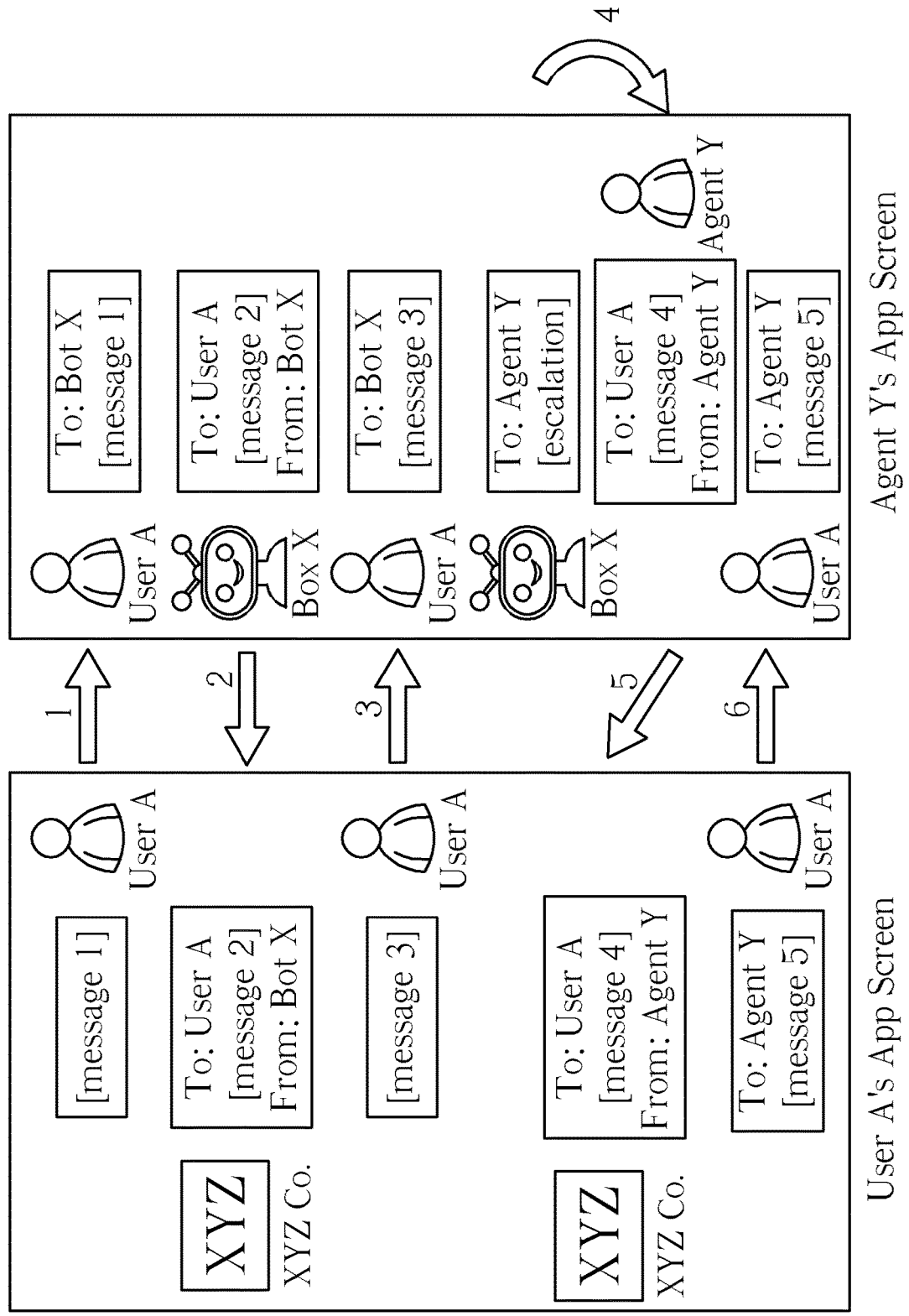
FIG. 5 illustrates two simplified screen shots of instant-messaging apps, respectively seen by a user (User A) and an enterprise human agent (Agent Y), during a three-way IM conversation among the user, the human agent and an enterprise chatbot (Bot X), consistent with some embodiments of the present invention.

FIG. 5 illustrates two simplified screen shots of instant-messaging apps, respectively seen by a user (User A) and an enterprise human agent (Agent Y), during a three-way IM conversation among User A, Agent Y, and an enterprise chatbot (Bot X). Here, Agent Y and Bot X are associated with enterprise XYZ Co. Conventionally, an IM message is placed inside a dialog box with the sender ID displayed on its left side for incoming messages, or on its right side for outgoing messages. In this example, User A's messaging app is linked to a public IM platform, and Agent Y's messaging app is linked to enterprise XYZ's IM platform. Notice that User A sees only a single messaging channel for communicating with XYZ Co.

FIG. 5 depicts the following sequence of message exchange: (1) User A sends message 1 to XYZ Co. over the public IM platform without identifying a receiver; upon receiving message 1, enterprise XYZ's IM platform attaches to message 1 a visible ID of its default receiver: Bot X (the sender ID of User A is displayed on the left side of the dialog box); (2) Bot X responds to User A with message 2, and XYZ's IM platform attaches to message 2 the IDs of both the sender and the receiver; (3) User A responds to Bot X with message 3, again without a receiver ID; recognizing that BOT X is the participant of ongoing IM conversation, XYZ's IM platform adds Bot X's ID (as the receiver) to message 3; (4) being unable to answer User A, Bot X sends an escalation message to Agent Y; (5) Agent Y sends message 4 to User A to engage in the ongoing conversation; and (6) User A replies with message 5 with Agent Y as the designated receiver.

Throughout the three-way IM conversation depicted above, User A is able to identify the sender and the receiver of every exchanged message, despite the communication being limited to a single messaging channel on the public IM platform. On the other side, over XYZ's IM platform, Agent Y is able to monitor and react to the entire IM conversation in real time.

The present disclosure describes systems and methods of instant-messaging bot that provide a scheme for a chatbot and human agents working in accord in communicating with users over a public instant-messaging (IM) platform. Such a system includes a chatbot application and an IM platform built for an enterprise (or organization) and connected with each other. The enterprise IM platform is further connected to one or more public IM platforms over the Internet.

The system allows any user connected to any one of the public IM platforms, and the chatbot and human agents connected to the enterprise IM platform, to use instant messaging to communicate with one another either one-to-one or as a group. On a connected public IM platform, although a user may only allow a single contact channel on his/her contact list for the enterprise, a method is provided here such that the user can communicate with the chatbot (virtual agent) and the human agents either individually or together using the single messaging channel. Furthermore, each enterprise agent, virtual or live, is individually identifiable during such messaging conversation. Messages of the same conversation are also shown in real time on the enterprise IM platform for the participating human agents to interact with the shown messages.

The present disclosure further provides an escalation mechanism for a user-chatbot conversation automatically escalated to one that includes a live agent whenever a preset condition for escalation is met.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for facilitating instant-messaging communications among a user, a chatbot, and human agents in a system of instant-messaging bot, the system of the instant-messaging bot comprising:

a chatbot application including software for receiving, processing, analyzing and responding to human-generated messages in a human-like manner;

an instant-messaging (IM) platform associated with an enterprise or organization connected to said chatbot application and separately connected to one or more public IM platforms via the Internet; and said enterprise IM platform including software for managing traffic of IM messages exchanged among said chatbot, one or more human agents connected to said enterprise IM platform, and any user connected to one of said public IM platforms;

the method comprising:

said enterprise IM platform automatically attaching visible identification (ID) labels to messages passing through it to identify the receiver and the sender of every message whenever necessary to avoid ambiguity, and hence allowing said chatbot and said human agents to share a single messaging channel over said public IM platform for communicating with said user;

said enterprise IM platform receiving any incoming message from said user without a receiver ID, and directing it to an enterprise receiver according to the following rule: (1) sending the message to said chatbot or a said human agent who is the current participant of ongoing IM communication with said user; (2) sending the message to said chatbot or a said human agent who is designated as the default receiver if the message is to initiate a new IM communication; and said enterprise IM platform supporting multi-channel messaging for any said human agent to engage in an IM communication with said chatbot or another human agent in parallel with said human agent's ongoing IM communication with said user.

2. The method for facilitating IM communications among the user, the chatbot, and the human agents in the system of the instant-messaging bot of claim 1, wherein said enterprise IM platform and said public IM platform are connected over the Internet using a webhook method with each IM platform addressable by a Uniform Resource Locator (URL).

3. The method for facilitating IM communications among the user, the chatbot, and the human agents in the system of the instant-messaging bot of claim 1, wherein said chatbot application includes a mechanism for automatically escalating a user-chatbot communication to one that includes one or more said human agents whenever a preset condition for escalation is met.

4. The method for facilitating IM communications among the user, the chatbot, and the human agents in the system of the instant-messaging bot of claim 3, wherein said escalation mechanism comprises:

- said chatbot application analyzing content, context, and sentiment of incoming messages from said user during an IM communication between said user and said chatbot;
- said chatbot application determining if any preset condition for escalation is met;
- said chatbot application sending an escalation message to at least one said human agent whenever an escalation condition is met; and
- a said human agent engaging in the ongoing IM communication by sending a greeting message to said user to pursue subsequent IM communication.

\* \* \* \* \*